United States Patent
Price

(10) Patent No.: US 6,752,329 B1
(45) Date of Patent: Jun. 22, 2004

(54) VALVE ASSEMBLY FOR VEHICLE WASHING SYSTEM

(76) Inventor: Kevin Price, 1 Tansy Close, Pen-ped-air-heol, Hengoed, Mid Glamorgan CF82 8LF (GB)

(*) Notice: Subject to any disclaimer, the term of this patent is extended or adjusted under 35 U.S.C. 154(b) by 0 days.

(21) Appl. No.: 10/019,677

(22) PCT Filed: Jul. 5, 2000

(86) PCT No.: PCT/GB00/02574
§ 371 (c)(1),
(2), (4) Date: May 21, 2002

(87) PCT Pub. No.: WO01/02221
PCT Pub. Date: Jan. 11, 2001

(30) Foreign Application Priority Data

Jul. 6, 1999 (GB) .............................................. 9915839

(51) Int. Cl.[7] ................................ B60S 1/46; B05B 1/30
(52) U.S. Cl. .................................. 239/284.2; 239/533.15
(58) Field of Search ......................... 239/284.2, 533.15; 15/250.4

(56) References Cited

U.S. PATENT DOCUMENTS

| | | |
|---|---|---|
| 4,955,543 A | 9/1990 | Orth et al. |
| 5,605,286 A | 2/1997 | Orth et al. |
| 5,762,271 A | 6/1998 | Lind et al. |

FOREIGN PATENT DOCUMENTS

| | | | | |
|---|---|---|---|---|
| DE | 41 21 316 A1 | 1/1992 | | |
| FR | 2 674 204 A1 | 9/1992 | | |
| GB | 1 450 403 A | 9/1976 | | |
| GB | 2059549 A | * 4/1981 | ........... | B65D/47/24 |
| GB | 2260535 A | 4/1993 | | |
| GB | 2272363 A | * 5/1994 | ............. | B60S/1/52 |

* cited by examiner

Primary Examiner—Brian L. Casler
Assistant Examiner—Lina R Kontos
(74) Attorney, Agent, or Firm—Rothwell, Figg, Ernst & Manbeck

(57) ABSTRACT

A valve assembly for controlling the delivery of cleaning fluid to a washer system of a vehicle is provided. The valve assembly includes a valve seat having a fluid input port through which fluid can enter the valve assembly, a resilient valve member extending across the valve seat and having a central zone and at least one hole through the valve member formed peripherally of the central zone, valve biasing means for biasing the central zone against the valve seat to close the valve and thereby seal the fluid inlet port and fixing means for fixing the peripheral edge of the valve member to the valve seat. The central zone of the valve member may be displaced away from the valve seat under the action of fluid pressure in the inlet port to open the valve and allow the cleaning fluid to exit the valve assembly via the at least one hole.

11 Claims, 6 Drawing Sheets

PRIOR ART

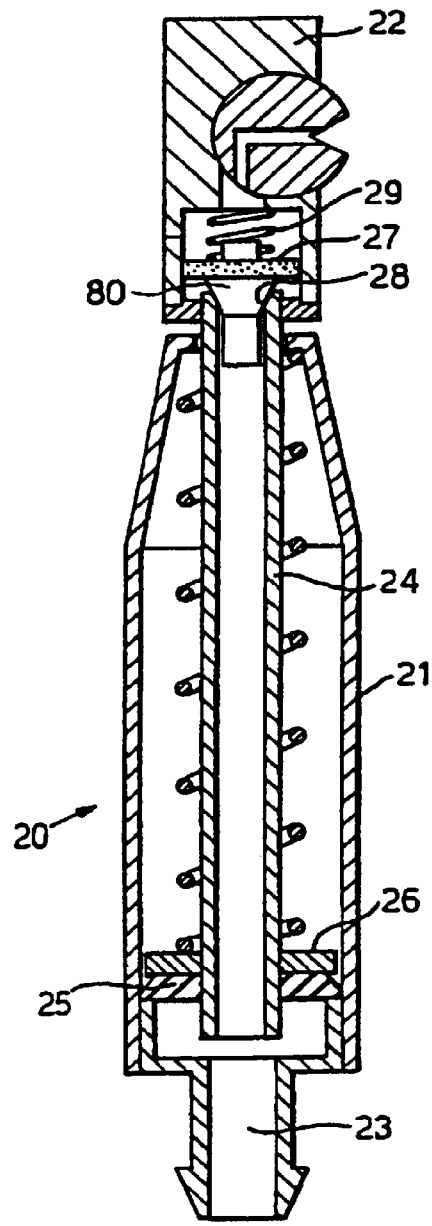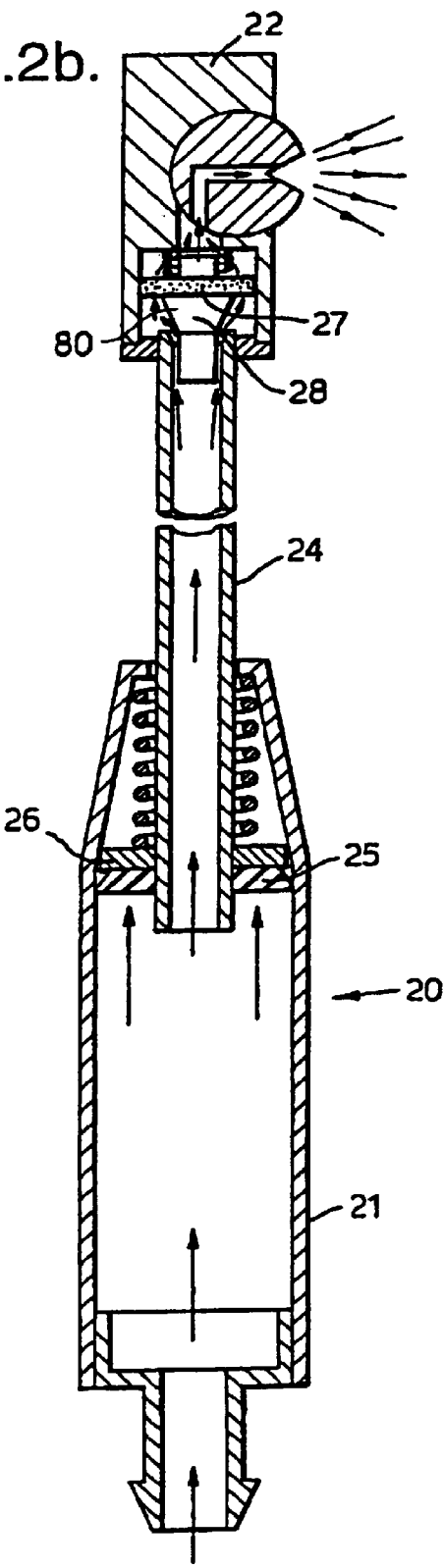
PRIOR ART

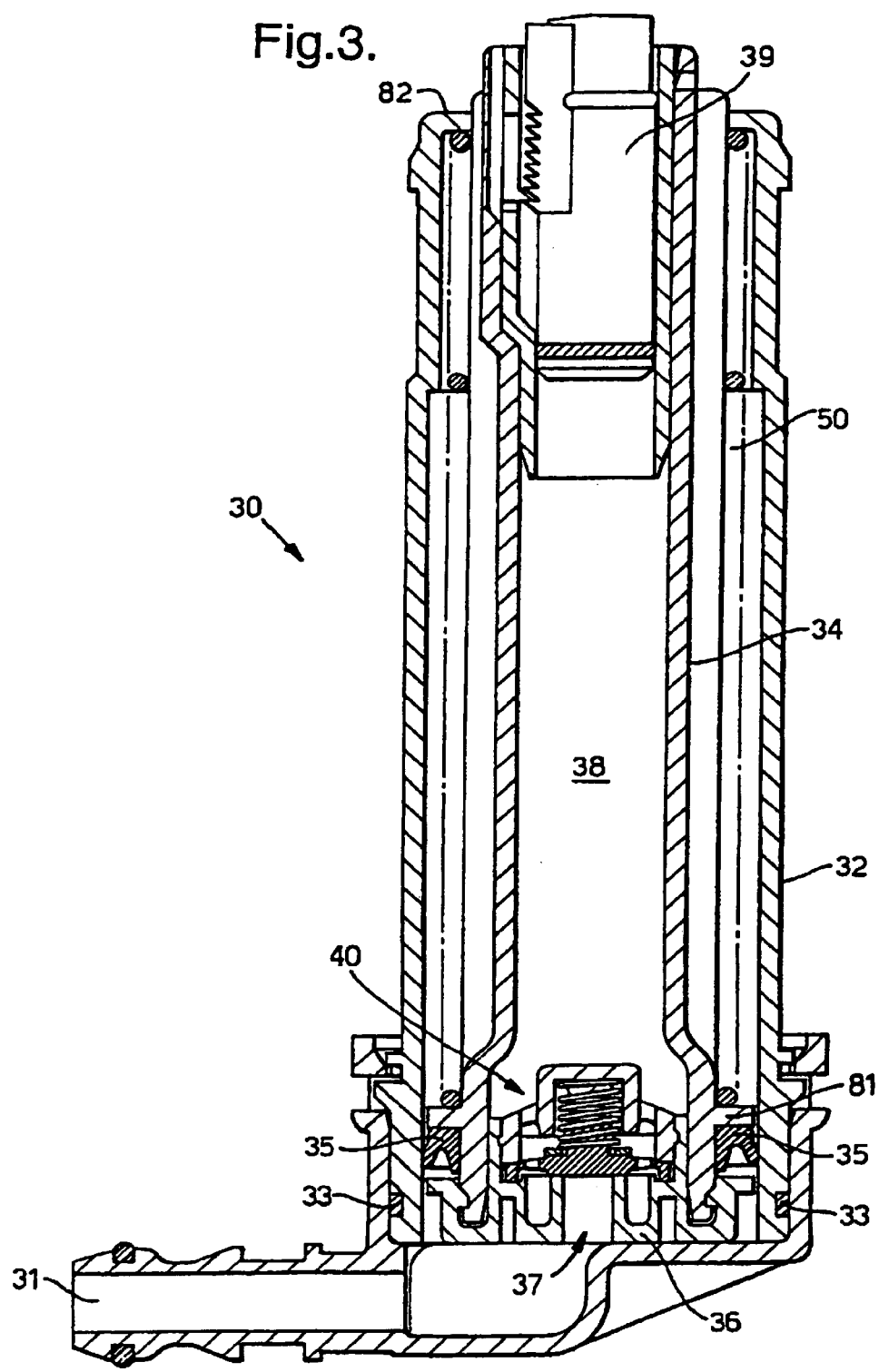

VALVE ASSEMBLY FOR VEHICLE WASHING SYSTEM

BACKGROUND OF THE INVENTION

1. Field of the Invention

The present invention relates to a washing system for a motor vehicle screen, and in particular but not exclusively to a valve assembly for use with such a washing system.

2. Description of the Related Art

Various washing systems which enable cleaning fluid to be delivered to clean headlamp screens and the like are known. In general they comprise a cleaning fluid source which is connected to a fluid delivery device which in an operational position can direct fluid onto the headlamp screen. Commonly the fluid delivery device will comprise a fixed nozzle, however for optimum performance it is often desirable for the nozzle to be close to the headlamp screen. With the present styling requirements of vehicles, it is increasingly found that this desired feature is difficult to achieve. Furthermore, for safety reasons, the nozzle should not be positioned so as to injure pedestrians in the case of an accident.

In order to overcome this problem, washing systems have been proposed in which the fluid delivery device is moveable between a retracted stand-by position and an extended operative position close to the headlamp screen. Such a known fluid delivery device is described in GB 2272363 which describes a telescopic washer which comprises a cylindrical housing having an inlet for the cleaning fluid. A nozzle carrier is mounted on a piston which is slidably mounted within the housing, and a nozzle is mounted on a distal end of the nozzle carrier which projects from the housing. The Substitute specification filed Feb. 27, 2003 in application Ser. No. 10/019,677 nozzle carrier is normally held in retracted position within the housing by a return spring. When washing fluid is introduced into the housing through the inlet, the pressure of the fluid forces the piston against the return force of the return spring into an operative position in which the nozzle carrier projects from the housing. Thus, the nozzle is moved from an inoperative position, for example at the lower edge of a headlamp, to an operative position, for example perpendicularly opposite the center of the headlamp. Thus, the nozzle does not normally obstruct the headlamp, but is located in a position of maximum washing efficiency when in use.

The nozzle carrier is an elongate tube along which cleaning fluid can travel to the nozzle. When the supply of cleaning fluid is turned on, it is important that flow through the nozzle is not permitted until the washer is fully in its operative position. In order to provide this desired effect a valve is employed within the telescopic washer. The valve is selected so that it opens to enable cleaning fluid to flow from the fluid reservoir to the nozzle only after the nozzle carrier is fully extended. Also the valve closes before the nozzle carrier begins to retract.

The telescopic washer system of GB 2272363 includes a housing within which a nozzle carrier is extendible under the action of cleaning fluid pressure entering the housing via an inlet port. The telescopic washer includes a valve to control delivery of cleaning fluid to the nozzle. However, a problem with the valve shown is that the valve is not constrained accurately once the valve has been opened. As a result, the valve requires locating portions to enable the valve to be located correctly on its return to the closed position. The valve is also susceptible to snagging as it slides within its recess.

Other valves have been suggested including so called proximity valves. These open and close not only under the influence of hydraulic pressures but are also structured to open once a portion of the washer system has been extended to a predetermined position. These types of valve require increased numbers of parts which therefore increases manufacturing costs and the possibility for product failure.

SUMMARY OF THE INVENTION

It is an object of the present invention to at least partly mitigate the above-referenced problems.

According to the present invention, there is provided a valve assembly for controlling the delivery of cleaning fluid to a washer system of a vehicle, comprising a valve seat having a fluid input port through which fluid can enter said valve assembly; a resilient valve member extending across the valve seat and having a central zone and at least one hole through said valve member formed peripherally of the central zone; valve biasing means for biasing said central zone against the valve seat to close the valve and thereby seal the fluid inlet port; and fixing means for fixing the peripheral edge of the valve member to the valve seat; wherein the central zone of said valve member may be displaced away from the valve seat under the action of fluid pressure in the inlet port to open the valve and allow the cleaning fluid to exit the valve assembly via said at least one hole.

Preferably the valve member comprises a valve assembly, wherein said valve member comprises a diaphragm constructed from a resilient material and having a generally flat central zone for sealing the fluid inlet port; and a plurality of holes disposed peripherally around said central zone, when said valve member is displaced, to allow fluid to flow from said inlet through said holes to an exit of the valve assembly.

According to the present invention, there is also provided a washer system including the valve assembly, in which said system comprises a telescopic fluid delivery system comprising a piston/cylinder combination connectable to a cleaning fluid source, one of the piston and cylinder being moveable relative to the other under the action of fluid pressure to extend an elongate nozzle support portion which supports a nozzle at its distal end for the delivery of cleaning fluid.

BRIEF DESCRIPTION OF THE SEVERAL VIEWS OF THE DRAWINGS

An embodiment of the present invention will now be described hereinafter with reference to the accompanying drawings in which:

FIG. 2 illustrates a cross-sectional view of a telescopic washer in accordance with the prior art;

FIG. 3 shows a cross-sectional view of a telescopic washer including a valve assembly in accordance with a first embodiment of the present invention;

DETAILED DESCRIPTION OF THE PREFERRED EMBODIMENTS

Figure 1:
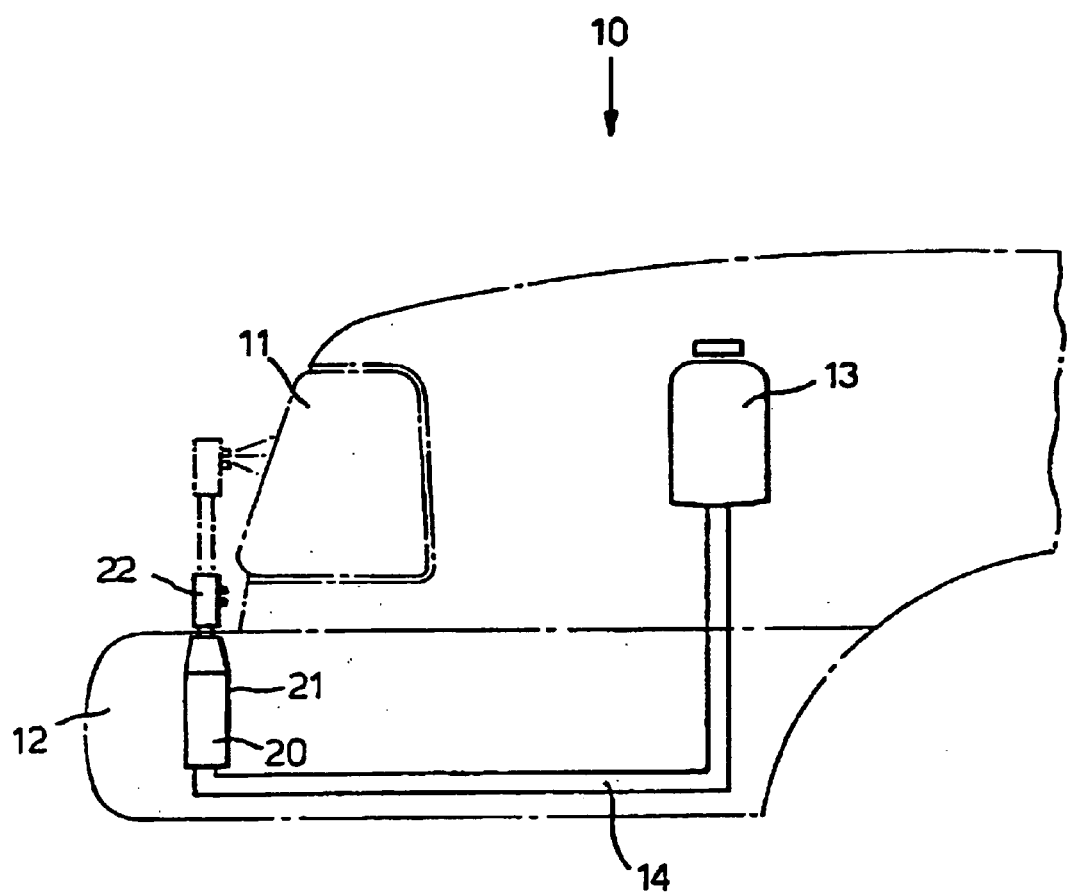
FIG. 1 illustrates the location of a fluid delivery system in a vehicle.

In the figures like reference numerals refer to like parts.

FIG. 1 illustrates diagrammatically the front of a car 10 with a headlamp 11 and a bumper 12. A supply reservoir 13 is housed within the car body and contains cleaning fluid which may be delivered to a telescopic washer 20 by way of a fluid delivery conduit 14. The telescopic washer 20 comprises an outer cylinder 21 and a nozzle carrier portion to which is secured a nozzle 22 for delivering cleaning fluid to the headlamp screen. The black lines show the telescopic washer in a first inoperative position in which the telescopic washer is contracted. The dotted lines show the fluid delivery nozzle in its fluid delivery location in which the washer is extended.

FIGS. 2a and 2b illustrate how a telescopic washer 20 can be extended from a first contracted position 2a to a second extended position 2b in accordance with the prior art.

The generally cylindrical housing 21 has, at one end, a fluid inlet port 23 through which cleaning fluid from the fluid delivery conduit is delivered to the washer. Within the housing is a nozzle carrier 24 which carries the nozzle 22 at one end. A sealing member 25 is secured towards the other end of the nozzle carrier 24. A spring biases the sealing member downwardly away from the upper portion of the housing thereby tending to keep the nozzle carrier in a contracted state within the housing 21.

When the headlamp requires, cleaning fluid is pumped 30 from the supply reservoir along conduit 14 and into the inlet 23. The pressure of the fluid exerts force on the lower part of the sealing member 25 which overcomes the biasing force of the spring and therefore causes the nozzle carrier to extend as shown in FIG. 2b. The upward motion of the nozzle carrier is restricted when the annular portion 26 abuts the inwardly facing surface of the housing. This prevents over compression of the spring.

A valve member 80 is placed at the output end of the nozzle carrier 24 to control delivery of the cleaning fluid to the nozzle 22. The valve is a poppet style valve which has a rim 27, a conical portion 28 and a biasing spring 29 which urges the conical portion of the valve against the outlet of the nozzle carrier to thereby seal the nozzle. When fluid pressure in the nozzle carrier 24 is sufficient the conical part of the valve is forced away from the end or the nozzle carrier thereby letting fluid into the chamber of the nozzle via holes formed through the rim 27. The fluid is then forced out of the nozzle to thereby aid in cleaning the headlamp.

At the end of the cleaning cycle the flow of fluid in the inlet is restricted and the biasing force of the spring causes the valve to close and then the nozzle carrier to return to its inoperative position.

FIG. 3 illustrates diagrammatically a telescopic washer 30 including a valve assembly 40 according to a first embodiment of the present invention. The washer 30 includes an inlet conduit 31 through which fluid can flow from a conduit 14. The inlet conduit is formed to snap fit around a lower portion of a generally cylindrical housing 32. The two are sealed with a fluid-tight seal 33.

A nozzle carrier 34 is positioned within the housing 32 and is sealed at its lower end against the inner surface of the housing with a fluid-tight seal 35. An inlet member 36 fits on the lower end of the housing and defines a fluid inlet port 37. A valve assembly 40 is positioned across the inlet port 37 to control the delivery of cleaning fluid into the chamber 38 within the nozzle carrier 34. Towards the upper end of the nozzle carrier 34 is an open nozzle 39 which operates when the carrier 34 is extended to direct cleaning fluid on the headlamp.

A spring 50 is placed within the housing 32. One end of the spring is urged against a rim 81 formed on the nozzle carrier 34 whilst the other end of the spring is urged against an inwardly turned edge 82 of the housing. The spring operates the bias nozzle carrier in its inoperative position in which the carrier is retracted within the housing 32. When the washer is operational, the nozzle carrier extends upwardly against the pressure exerted by the spring which is therefore compressed. The extension of the nozzle carrier is restricted by the rim 81 and an abutment zone formed on the inner surface of the housing 32.

Figure 4:
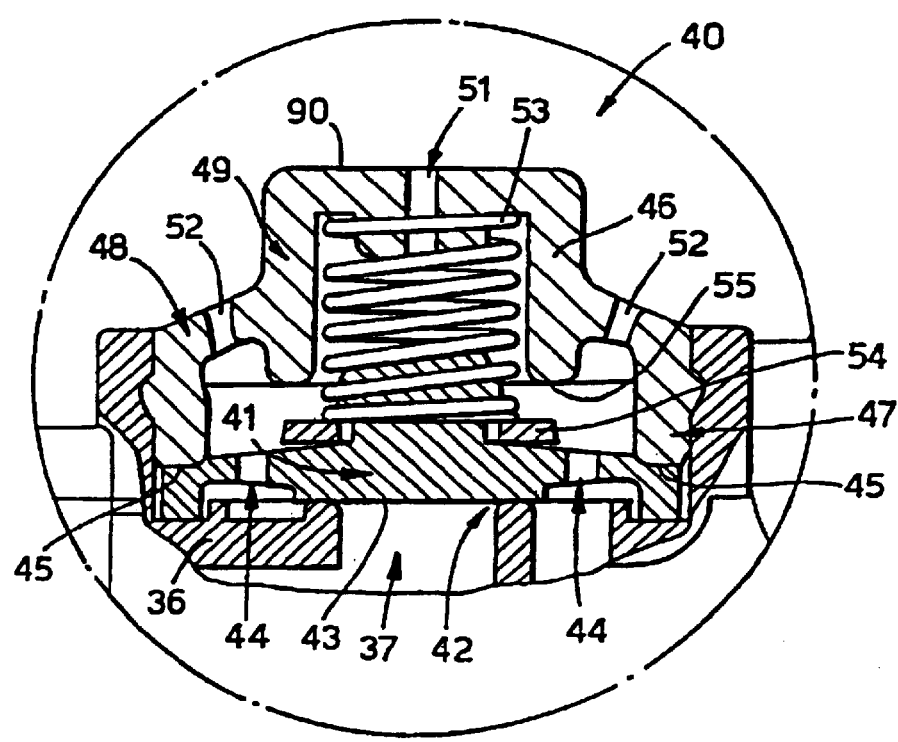
FIG. 4 illustrates a valve assembly in accordance with a first embodiment of the present invention.

The valve assembly 40 is shown in more detail in FIG. 4. As may be seen an upper portion of the inlet member 36 forms a valve seat upon which the valve assembly is mounted. A diaphragm valve 41 is positioned across the inlet port 37 and abuts a raised abutment area 42 formed as an annulus around the inlet port 37. The diaphragm valve is formed of a resilient material such as EPDM rubber and has on one side a substantially flat, circular central zone e3. A plurality of holes 44 which perforate the diaphragm valve are formed through the diaphragm valve 41 peripherally around the central zone. The diaphragm valve member 41 is fixed at its edges by being compressed between the inlet member 36 and the lip 45 of an open-mouthed valve body e46. The valve body 46 has a generally cylindrical open-mouthed portion 47 which extends to a tapered conical portion 48 which narrows to a further substantially cylindrical portion 49 having a blind end 90. The blind end may have a small hole 51 formed therethrough. A plurality of holes 52 are formed through the valve body around the tapered conical portion. By fixing the position of the valve in this way, the position to which the central zone of the valve will return after opening then closing can be predetermined which helps ensure the correct functioning of "the valve.

A spring 53 is situated within the valve body and is secured at one end to a spring restraining portion of the blind end of the valve body. The other end of the spring is secured to a part of the diaphragm valve member in order to bias the central zone 43 of the perforated diaphragm valve against the valve seat. A washer 54 is secured around a stem portion of the diaphragm valve on the reverse side from the central zone. The washer is formed of a durable material such as Nylon.

When the fluid pressure is increased in order to clean the headlamp of a vehicle, pressure of the fluid at the inlet port 37 increases accordingly. The spring parameters in the valve assembly are selected so that the pressure at which the diaphragm valve opens is greater than the fluid pressure which is required to force the nozzle carrier upwardly against the biasing influence of the spring 50. Once the nozzle carrier has extended, the increasing fluid pressure is eventually sufficient to overcome the biasing influence of spring 53 and open the valve 41 by displacing the central zone 43 away from the abutment area 42. The washer 54 is urged upwardly until it abuts the end wall 55 of the valve body to thereby limit the displacement of the central zone 43. By manufacturing the washer of the durable material, the lifetime of the diaphragm valve may be extended. From this moment fluid can flow along a fluid path from the inlet through the holes 44 in the valve and out of the valve assembly through the holes 52 formed in the valve body. The fluid thus enters the chamber 38 and fills the chamber until water is eventually ejected through the nozzle 39 onto the headlamp.

When the washer is no longer required, the fluid flow from the reservoir 13 will be stopped. The pressure of the fluid on the inlet member 36 and at the fluid inlet 37 thus drops.

The valve of the valve assembly closes at a fluid pressure which is greater than the pressure at which the nozzle carrier begins to contract. In this way, fluid flow through the nozzle is prevented at, any point other than at full extension of the nozzle carrier.

Figure 5:
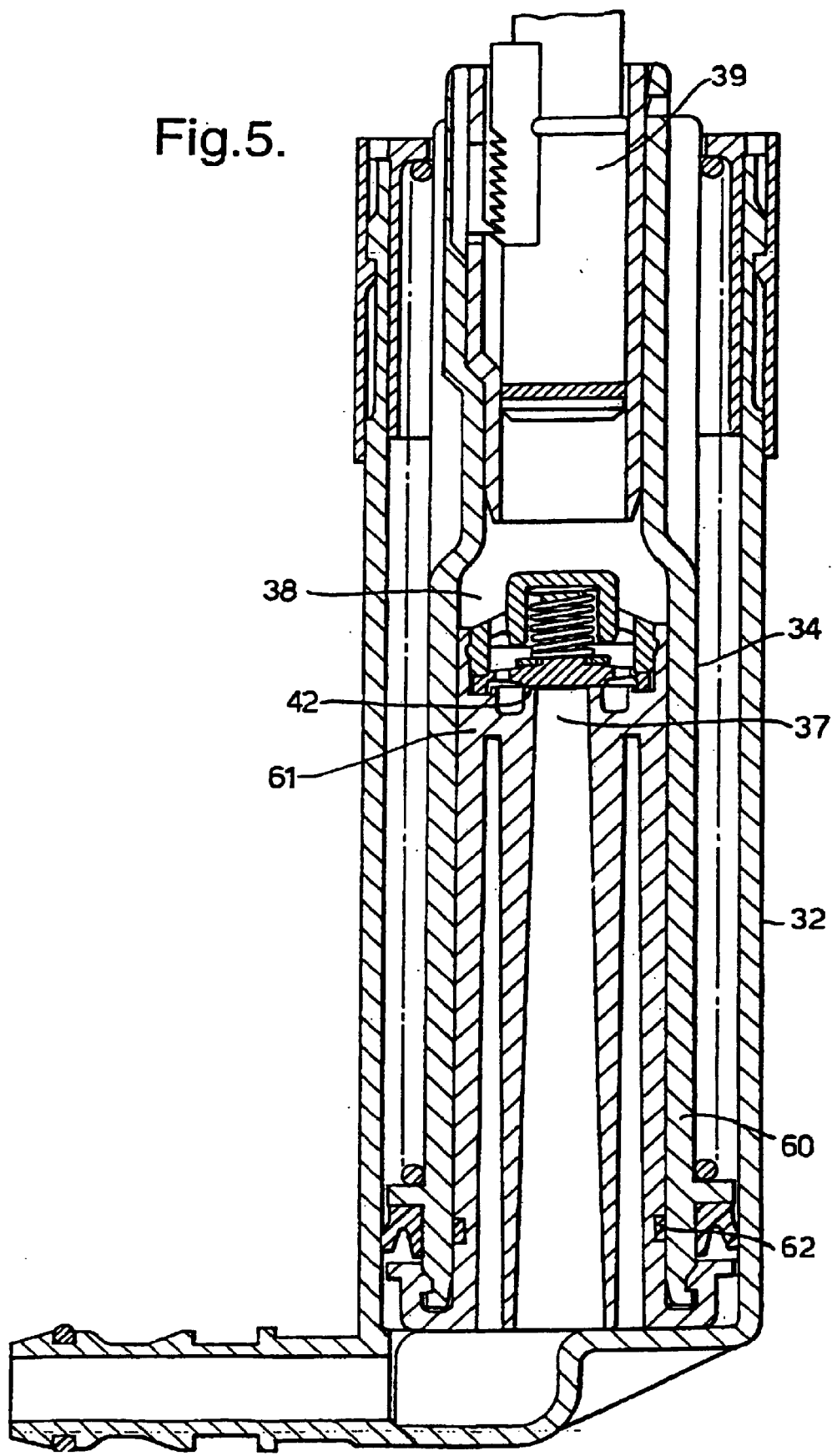
FIG. 5 illustrates a further example of a telescopic washer for use with a valve assembly.

As a result of placing the valve assembly 40 relatively low down in the nozzle carrier, a relatively large chamber 38 is produced which requires priming with fluid before the fluid can be sprayed from the nozzle. Also, once the valve has closed, a substantial quantity of fluid is retained in the chamber which can leak out of the nozzle. FIG. 5 illustrates a telescopic washer which can overcome these disadvantages.

Figure 6:
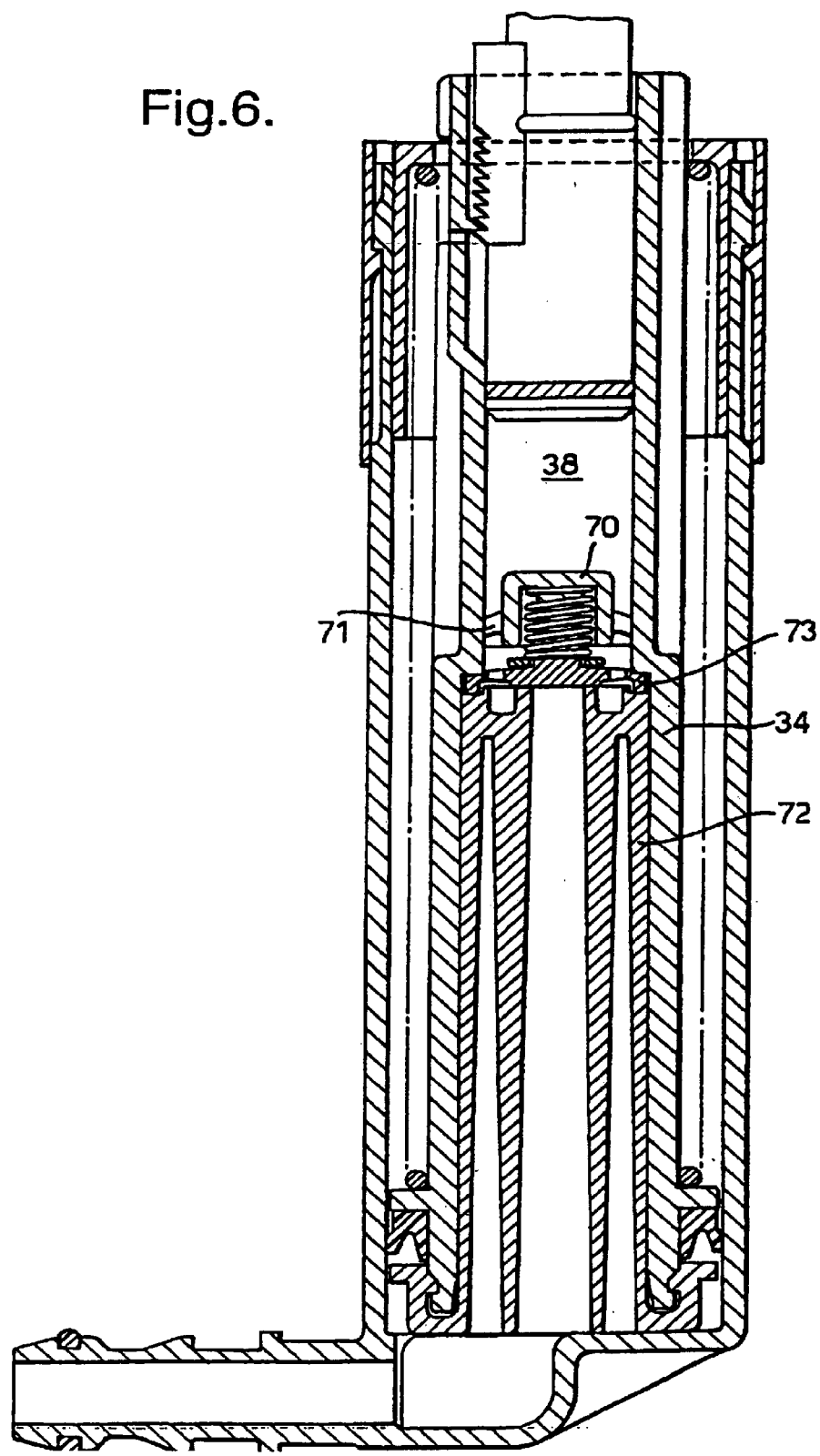
FIG. 6 illustrates a cross-sectional view of a telescopic washer including a valve assembly in accordance with a second embodiment of the present invention.

In the example shown in FIG. 5, the inlet conduit is integrally formed with the cylindrical housing 32. The nozzle 39 is formed similarly to that as above described, however the nozzle carrier 60 has an enlarged diameter towards its lower portion which contains a valve support 61. The support 61 is formed at its upper end into the valve seat having raised abutment area 42 formed around the inlet port 37. The outer surface of the valve support is sealed with a fluid-type seal 62 to the inner surface of the nozzle carrier. By utilizing an elongated valve support in this way, the priming chamber 38 can be much reduced in size which improves the functioning of the washer system. FIG. 6 illustrates a further telescopic washer including a valve assembly according to a second embodiment of the present invention. In comparison to the valve assembly of FIGS. 3 to 5, the valve body 70 shown in FIG. 6 is formed integrally with the nozzle carrier 34. A plurality of holes 71 are formed through the valve body to allow fluid to exit the valve assembly and flow into the chamber 38. By forming the valve body in this way, the number of separate parts of the valve assembly can be reduced which makes manufacturing and assembly more efficient. Likewise the fluid-type seal around the valve support 72 and nozzle carrier 34 is modified in this embodiment and is provided by the peripheral edge 73 of the diaphragm valve member. By fixing the position of the diaphragm valve in this way, the resilient material of the diaphragm valve forms a good fluid-type seal. The accurate positioning of the diaphragm valve also ensures that the return position of the valve is guaranteed which ensures the correct functioning of the valve.

It will be understood by those skilled in the art that alternatives to the above examples could be made without departing from the scope of the present invention.

What is claimed is:

1. A valve assembly for controlling the delivery of cleaning fluid to a washer system of a vehicle, comprising:
   a valve seat having a fluid input port through which fluid can enter said valve assembly;
   a resilient valve member extending across the valve seat and having a central zone and at least one hole through said valve member formed peripherally of the central zone;
   valve biasing means for having said central zone against the valve seat to close the valve and thereby seal the fluid inlet port; and
   fixing means for fixing the peripheral edge of the valve member to the valve seat; wherein
   the central zone of said valve member may be displaced away from the valve seat under the action of fluid pressure in the inlet port to open the valve and allow the cleaning fluid to exit the valve assembly via said at least one hole.

2. A valve assembly according to claim 1, wherein said valve member comprises:
   a diaphragm constructed from a resilient material and having a generally flat central zone for sealing the fluid inlet port; and
   a plurality of holes disposed peripherally around said central zone, when said valve member is displaced, to allow fluid to flow from said inlet through said holes to an exit of the valve assembly.

3. A valve assembly according to claim 1, further comprising a valve body portion having an open-mouthed end, which engages said peripheral edge of the valve member to provide said fixing means, and which extends to a tapered conical portion which narrows into a substantially cylindrical portion having a substantially blind end and in which at least one hole is formed in said valve body to allow cleaning fluid to exit the valve assembly.

4. A valve assembly according to claim 1, wherein said valve seat further comprises an annular abutment member disposed around said inlet port against which said central zone is biased in a closed position.

5. A valve assembly according to claim 1, wherein said valve assembly further comprises a further abutment member operable to limit said displacement of said central zone.

6. A valve assembly according to claim 1, further comprising:
   a durable washer member disposed around a stem portion of said valve member on the opposite side from said inlet port.

7. A valve assembly according to claim 1, in which said valve biasing means comprises a spring.

8. A washer system including the valve assembly of claim 1, in which said system comprises a telescopic fluid delivery system comprising:
   a piston/cylinder combination connectable to a cleaning fluid source, one of the piston and cylinder being movable relative to the other under the action of fluid pressure to extend an elongate nozzle carrier which supports a nozzle at its distal end for the delivery of cleaning fluid.

9. A washer system according to claim 8, wherein said valve assembly is disposed in a fluid flow path of said fluid delivery system and is operable to define a first fluid pressure at which said valve is opened and a second fluid pressure at which said valve closes.

10. A washer system according to claim 9, wherein said valve opens under a fluid pressure which is greater than a pressure which extends said nozzle carrier portion and closes under a pressure which is greater than a fluid pressure at which said nozzle carrier portion retracts.

11. A washer system according to claim 10, wherein said valve opens at a pressure of approximately 20 phi and closes at approximately 15 psi.

* * * * *